US011252429B2

(12) United States Patent
Abdelkhalek et al.

(10) Patent No.: US 11,252,429 B2
(45) Date of Patent: Feb. 15, 2022

(54) LOW-LATENCY CONSUMPTION OF AN ENCODED VIDEO BITSTREAM

(71) Applicant: ATI Technologies ULC, Markham (CA)

(72) Inventors: Ahmed M. Abdelkhalek, Ajax (CA); Edward A. Harold, Scarborough (CA); Andy Sung, Richmond Hill (CA); Stephen Ho, Markham (CA); Lei Zhang, Richmond Hill (CA); Ihab Amer, Stouffville (CA); Gabor Sines, Toronto (CA); Zhiqi Hao, Richmond Hill (CA); Yang Liu, Toronto (CA); Baochun Li, Toronto (CA); Kai Sun, Markham (CA)

(73) Assignee: ATI Technologies ULC, Markham (CA)

( * ) Notice: Subject to any disclaimer, the term of this patent is extended or adjusted under 35 U.S.C. 154(b) by 0 days.

(21) Appl. No.: 15/965,281

(22) Filed: Apr. 27, 2018

(65) Prior Publication Data

US 2019/0335189 A1 Oct. 31, 2019

(51) Int. Cl.
*H04N 19/463* (2014.01)
*H04N 19/593* (2014.01)
*H04N 19/152* (2014.01)

(52) U.S. Cl.
CPC ......... *H04N 19/463* (2014.11); *H04N 19/152* (2014.11); *H04N 19/593* (2014.11)

(58) Field of Classification Search
USPC .................................................. 375/240.12
See application file for complete search history.

(56) References Cited

U.S. PATENT DOCUMENTS 5,592,227 A * 1/1997 Feng ....................... G06T 9/008
375/240.14
5,768,533 A 6/1998 Ran
(Continued)

FOREIGN PATENT DOCUMENTS

EP           3098762 A1    11/2016
WO    2017003887 A1     1/2017

OTHER PUBLICATIONS

Hoffman, D., Fernando, G., Goyal, V., and M. Civanlar, "RTP Payload Format for MPEG1/MPEG2 Video", RFC 2250, DOI 10.17487/RFC2250, Jan. 1998, <https://www.rfc-editor.org/info/rfc2250> (Year: 1998).*
International Search Report and Written Opinion in International Application No. PCT/IB2019/051542, dated May 31, 2019, 8 pages.
Lagudu et al., U.S. Appl. No. 16/177,218, entitled "Low Latency Long Short-Term Memory Inference with Sequence Interleaving", filed Oct. 31, 2018, 28 pages.
(Continued)

*Primary Examiner* — Stuart D Bennett
(74) *Attorney, Agent, or Firm* — Rory D. Rankin; Kowert, Hood, Munyon, Rankin & Goetzel, P.C (57) ABSTRACT

Systems, apparatuses, and methods for reducing latency when consuming an encoded video bitstream in real-time are disclosed. A video encoder encodes a video bitstream and writes chunks of the encoded bitstream to a bitstream buffer. Prior to the encoder completing the encoding of an entire frame, or an entire slice of a frame, a consumer module consumes encoded chunks of the bitstream. In one implementation, to enable pipelining of the consumption with the encoding, the encoder updates a buffer write pointer with an indication of the amount of data that has been written to the bitstream buffer. The consumer module retrieves encoded data from the bitstream buffer up to the location indicated by the buffer write pointer. In this way, the consumer module is able to access and consume encoded video data prior to the encoder finishing encoding an entire frame or an entire slice of the frame.

20 Claims, 10 Drawing Sheets

(56) References Cited

U.S. PATENT DOCUMENTS

| | | | |
|---|---|---|---|
| 6,067,287 A | 5/2000 | Chung-Ju et al. | |
| 6,654,539 B1* | 11/2003 | Duruoz | H04N 5/783 386/343 |
| 8,131,660 B2 | 3/2012 | Davis et al. | |
| 10,078,794 B2 | 9/2018 | Pierce et al. | |
| 2006/0039483 A1 | 2/2006 | Lee et al. | |
| 2009/0284581 A1 | 11/2009 | Elbaz et al. | |
| 2012/0182582 A1* | 7/2012 | Nagai | G06K 15/1817 358/1.16 |
| 2014/0176586 A1* | 6/2014 | Gruber | G06F 12/0607 345/533 |
| 2015/0195379 A1* | 7/2015 | Zhang | G06F 16/9577 709/219 |
| 2015/0281705 A1* | 10/2015 | Wang | H04N 19/46 375/240.03 |
| 2016/0219301 A1* | 7/2016 | Pettersson | H04N 19/58 |
| 2017/0041625 A1 | 2/2017 | Bates et al. | |
| 2017/0064320 A1 | 3/2017 | Sadhwani et al. | |
| 2018/0189641 A1 | 7/2018 | Boesch et al. | |
| 2019/0028752 A1 | 1/2019 | Zhang et al. | |
| 2019/0147332 A1 | 5/2019 | Lagudu et al. | |
| 2019/0325305 A1 | 10/2019 | Zhang et al. | |

OTHER PUBLICATIONS

Zhang et al., U.S. Appl. No. 16/234,956, entitled "Tiling Format for Convolutional Neural Networks", filed Dec. 28, 2018, 42 pages.
Wang et al., U.S. Appl. No. 16/367,093, entitled "Auto Generation and Tuning Tool for Convolution Kernels", filed Mar. 27, 2019, 32 pages.
International Search Report and Written Opinion in International Application No. PCT/US2018/052358, dated Feb. 18, 2019, 13 pages.
Cecconi et al., "Optimal Tiling Strategy for Memory Bandwidth Reduction for CNNs", International Conference on Advanced Concepts for Intelligent Vision Systems, Sep. 18, 2017, pp. 89-100.
Fan et al., "F-C3D: FPGA-based 3-Dimensional Convolutional Neural Network", 27th International Conference on Field Programmable Logic and Applications (FPL), Sep. 4, 2017, 4 pages.
Rahman et al., "Efficient FPGA Acceleration of Convolutional Neural Networks Using Logical-3D Compute Array", Proceedings of the 2016 Conference on Design, Automation & Test in Europe, Mar. 14, 2016, pp. 1393-1398.
First Examination Report in Indian Patent Application No. 202017050587, dated Aug. 16, 2021, 6 pages.

* cited by examiner

LOW-LATENCY CONSUMPTION OF AN ENCODED VIDEO BITSTREAM

BACKGROUND

Description of the Related Art

The bandwidth requirements of digital video streaming continue to grow with time. Various applications benefit from video compression which requires less storage space for archived video information and/or less bandwidth for the transmission of the video information. Accordingly, various techniques to improve the quality and accessibility of the digital video have being developed. An example of such a technique is described H.264 which is a video compression standard, proposed by the Joint Video Team (JVT). Many of today's multimedia-enabled digital devices incorporate digital video codec's (hardware and/or software configured to encode and/or decode data) that conform to the H.264 standard. The High Efficiency Video Coding (HEVC) standard is another video compression standard which followed H.264.

To prepare video for streaming, storage, or additional processing, a hardware accelerator (e.g., video encoder) outputs an encoded bitstream for each video frame. The encoded bitstream is typically written to memory before being consumed by another logical unit (e.g., for network transmission). Video consumption (e.g., streaming) of each encoded video frame is typically initiated after each frame is completely encoded. In other words, a video encoder typically waits until an entire frame has been encoded to confirm that all bitstream memory write operations have been completed, confirm how many bits have been written, and provide a way for the bitstream consumer to determine the number of bits that were written and the location of the bitstream on the storage device. A disadvantage of this approach is that it means consumption of the encoded frame can only begin when the entire frame has been encoded. This prevents frame encoding from being pipelined with other actions such as network transmission, resulting in increased latency.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, methods, and computer-readable mediums for enabling low-latency consumption of an encoded video bitstream prior to an entire frame or slice being encoded are disclosed herein. A system includes at least one or more processors coupled to a memory device. The one or more processors include circuitry which executes at least a video encoder and a consumer module. The consumer module is any of various types of logical units which access and consume (e.g., send over a network) the encoded video bitstream in real-time as the video bitstream is encoded by the video encoder. Rather than waiting until an entire frame or slice has been encoded by the video encoder, the consumer module starts to process the encoded bitstream mid-frame and/or mid-slice. It is noted that slice-encoding is typically codec-specific, and any of various types of slice encodings are used in various embodiments. The techniques described herein for on-the-fly consumption of an encoded video bitstream are applicable to full frame encoding or any codec-specific sub-frame encoding (e.g., H-264 slice encoding)

In one implementation, in order to facilitate the consumption of the encoded bitstream prior to completing the encoding of the entire frame, the video encoder periodically updates a buffer write pointer with an indication of the amount of encoded data written to a video buffer. In one implementation, a granularity at which the video encoder updates the buffer write pointer is programmable. In one implementation, the consumer module programs the granularity at which the video encoder updates the buffer write pointer. In other words, the video encoder is configurable to update the buffer write pointer after writing a particular number of bits of encoded data to the buffer (e.g., 512 bits, 1024 bits, etc.). In the event a last portion of a frame encoded results in fewer than the granularity, the video encoder updates the buffer write pointer and sets the frame completion flag to indicate encoding of the frame is complete. In this case, the chunk has a different size than the above mentioned granularity (i.e., the chunk size is variable).

In parallel with the video encoder encoding the video bitstream, the consumer module monitors updates to the buffer write pointer. After detecting an update to the buffer write pointer, the consumer module reads from the bitstream buffer up to a location indicated by the buffer write pointer. In addition to the bitcount, the buffer write pointer also includes a frame completion flag to indicate whether or not frame encoding has completed for the current flame. In one implementation, the frame completion flag is set to true (e.g., 1) by the video encoder when frame encoding is completed for the current frame and the buffer write pointer has the final frame bitcount for the current frame. In this implementation, the frame completion flag is reset to false (e.g., 0) by the consumer module after the consumer module has retrieved all of the encoded data from the video buffer for the current frame. The frame completion flag provides a way for the consumer module to determine that the buffer write pointer will no longer be updated for the current frame, allowing the consumer module to read any remaining encoded bitstream data even if the amount of data is less than the specified granularity. In one implementation, frame completion synchronization is implemented separately from buffer write pointer updates.

Figure 1:
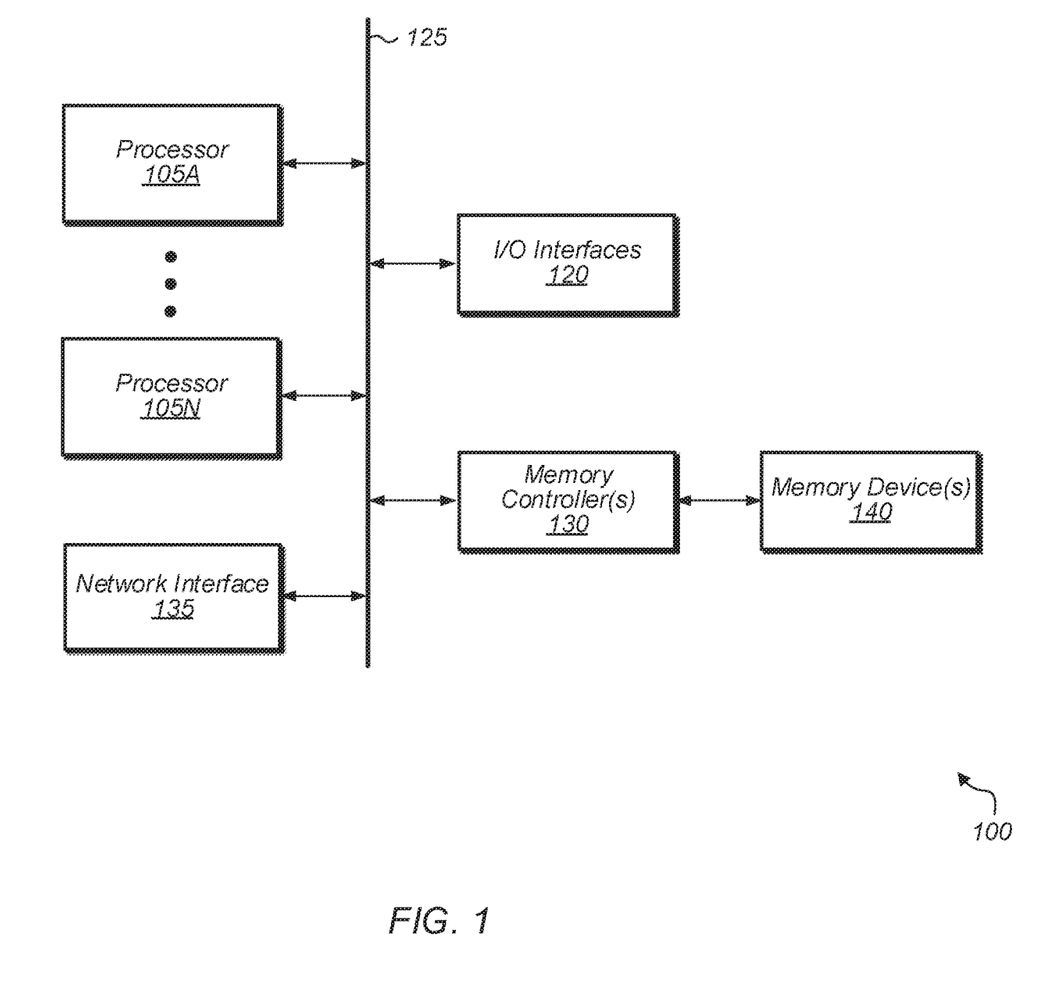
FIG. 1 is a block diagram of one implementation of a computing system.

Referring now to FIG. 1, a block diagram of one implementation of a computing system 100 is shown. In one implementation, computing system 100 includes at least processors 105A-N, input/output (I/O) interfaces 120, bus 125, memory controller(s) 130, network interface 135, and memory device(s) 140. In other implementations, computing system 100 includes other components and/or computing system 100 is arranged differently. Processors 105A-N are representative of any number of processors which are included in system 100.

In one implementation, processor 105A is a general purpose processor, such as a central processing unit (CPU). In one implementation, processor 105N is a data parallel processor with a highly parallel architecture. Data parallel processors include graphics processing units (GPUs), digital signal processors (DSPs), field programmable gate arrays (FPGAs), application specific integrated circuits (ASICs), and so forth. One or more of processors 105A-N include circuitry to implement a video encoder and a consumer module. The consumer module accesses and consumes an encoded bitstream of a video frame in real-time while the video encoder is encoding the video frame.

Memory controller(s) 130 are representative of any number and type of memory controllers accessible by processors 105A-N and I/O devices (not shown) coupled to I/O interfaces 120. Memory controller(s) 130 are coupled to any number and type of memory devices(s) 140. Memory device(s) 140 are representative of any number and type of memory devices. For example, the type of memory in memory device(s) 140 includes Dynamic Random Access Memory (DRAM), Static Random Access Memory (SRAM), NAND Flash memory, NOR flash memory, Ferroelectric Random Access Memory (FeRAM), or others.

I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices (not shown) are coupled to I/O interfaces 120. Such peripheral devices include (but are not limited to) displays, keyboards, mice, printers, scanners, joysticks or other types of game controllers, media recording devices, external storage devices, network interface cards, and so forth. Network interface 135 is used to receive and send network messages across a network.

In various implementations, computing system 100 is a computer, laptop, mobile device, game console, server, streaming device, wearable device, or any of various other types of computing systems or devices. It is noted that the number of components of computing system 100 varies from implementation to implementation. For example, there can be more or fewer of each component than the number shown in FIG. 1. It is also noted that computing system 100 can include other components not shown in FIG. 1. Additionally, in other implementations, computing system 100 can be structured in other ways than shown in FIG. 1.

Figure 2:
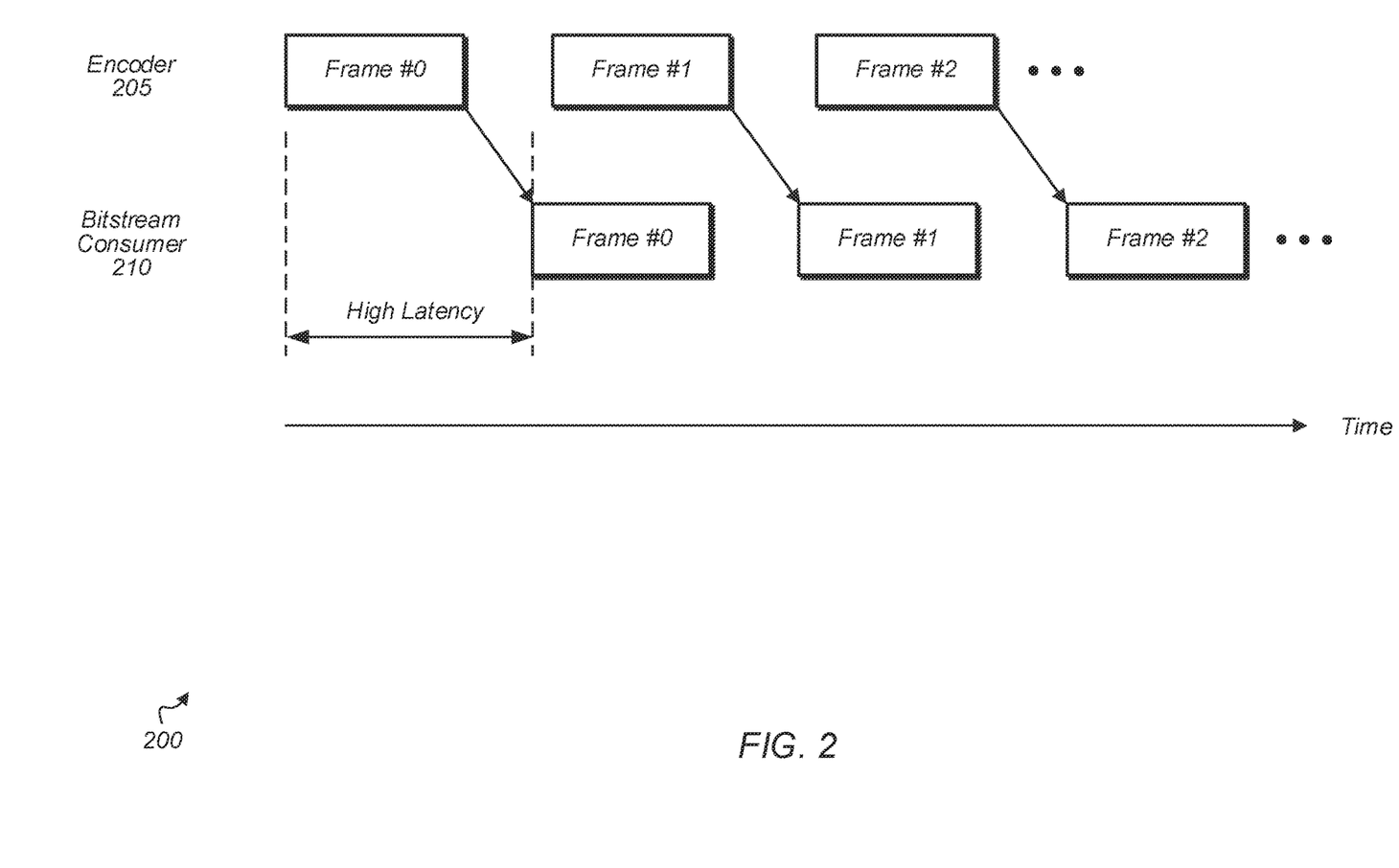
FIG. 2 is a timing diagram of one implementation of the operations for an encoder and a bitstream consumer.

Turning now to FIG. 2, a timing diagram 200 of one implementation of the operations for an encoder 205 and a bitstream consumer 210. In one implementation, an encoder 205 encodes individual frames 0-2 of a video stream and makes each frame available to bitstream consumer 210 at the end of each frame. For example, encoder 205 confirms bitstream memory write operations have completed, confirms how many bits have been written to the bitstream buffer, and then provides a way for the bitstream consumer to determine the size and location of the encoded bitstream in memory. It is noted that bitstream consumer 210 can also be referred to as a "consumer module". Encoder 205 encodes the video stream in accordance with any of various coding standards. For example, in one implementation, encoder 205 encodes a bitstream to be compliant with the H.264 video compression standard. In another implementation, encoder 205 encodes a bitstream to be compliant with the High Efficiency Video Coding (HEVC) standard. In other implementations, encoder 205 encodes a bitstream to be compliant with other standards.

Accordingly, as shown in timing diagram 200, bitstream consumer 210 is only able to start consuming a given frame after encoder 205 has encoded the entire frame. For example, only after frame 0 has been completely encoded by encoder 205 is bitstream consumer 210 able to start consuming the encoded bitstream generated for frame 0. The same sequence of events occurs for frames 1-2. This results in a delay from the time when encoder 205 starts encoding a frame and to the time when bitstream consumer 210 is able to start consuming the encoded frame.

Figure 3:
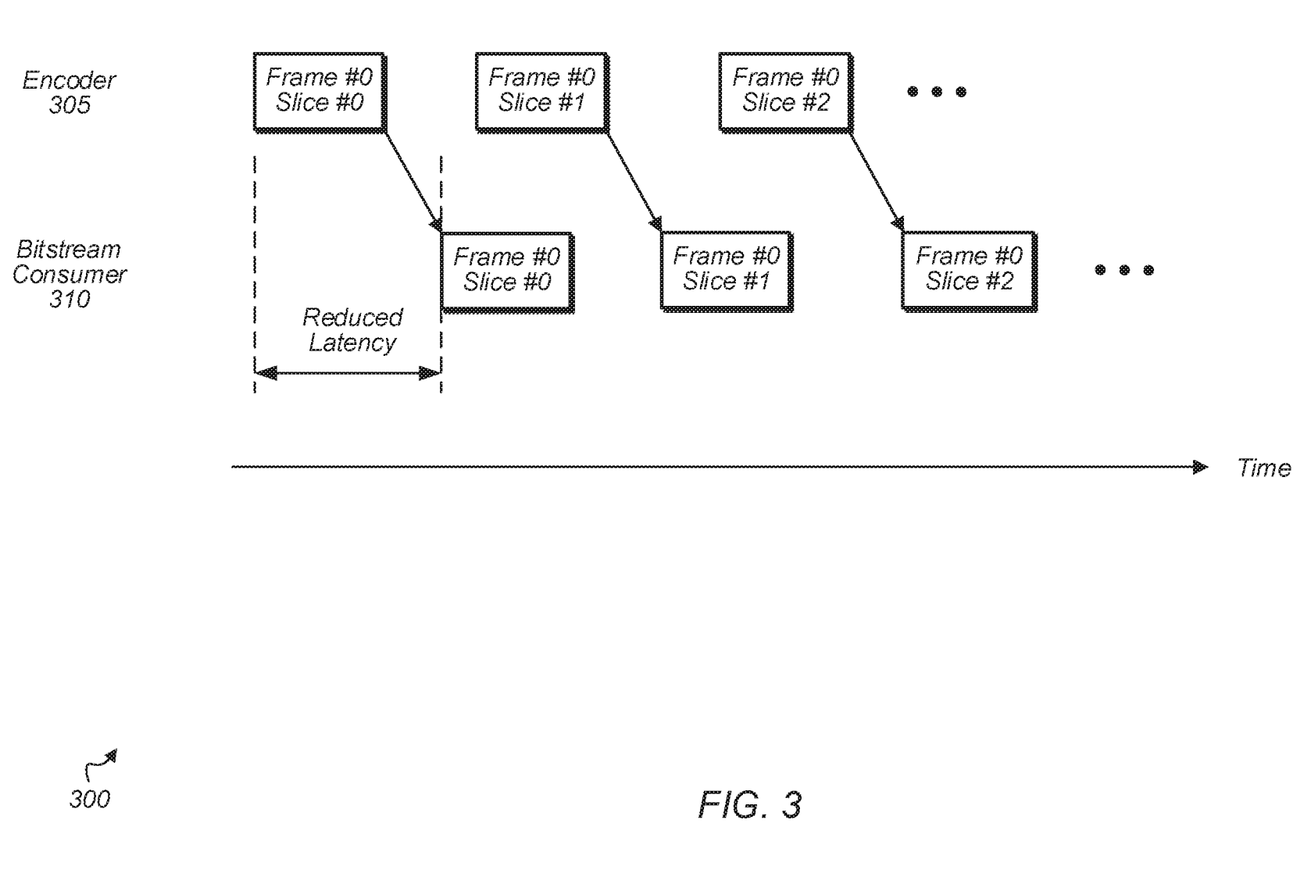
FIG. 3 is a timing diagram of another implementation of the operations for an encoder and a bitstream consumer.

Referring now to FIG. 3, a timing diagram 300 of another implementation of the operations for an encoder 305 and a bitstream consumer 310 is shown. In the implementation illustrated in timing diagram 300, encoder 305 encodes slices of a frame and then bitstream consumer 310 is able to consume an individual slice after encoder 305 has finished encoding the given slice. This helps to reduce the latency of operations as compared to the implementation illustrated in timing diagram 200 (of FIG. 2). For example, encoder 305 encodes slice 0 of frame 0 and then makes the location and size of encoded slice 0 available to bitstream consumer 310. Then, bitstream consumer 310 is able to consume encoded slice 0 while encoder 305 starts to encode slice 1 of frame 0. This pattern continues for slices 1-2 of frame 0 and the subsequent slices of frame 0. As the content and structure of slices are typically defined by a compression standard, codecs used to generate such slices conform to the corresponding standard. As used herein, slices are also referred to herein as "codec-level slices".

While the implementation illustrated in timing diagram 300 results in reduced latency compared to the implementation illustrated in timing diagram 200, a drawback of the slice-based approach is the slice-boundary effect which potentially introduces visual artifacts that degrade the user experience. Furthermore, the slice-based approach reduces compression efficiency since some coding standards (e.g., H.264) stipulate that prediction cannot be performed across slices. In such cases, each slice of a frame is encoded independent of other slices of the frame. In addition, the slice-based approach results in extra slice header overhead as each slice will include a header at the beginning of the slice. The negative effects of the slice-based approach are amplified as the number of slices per frame increases.

Figure 4:
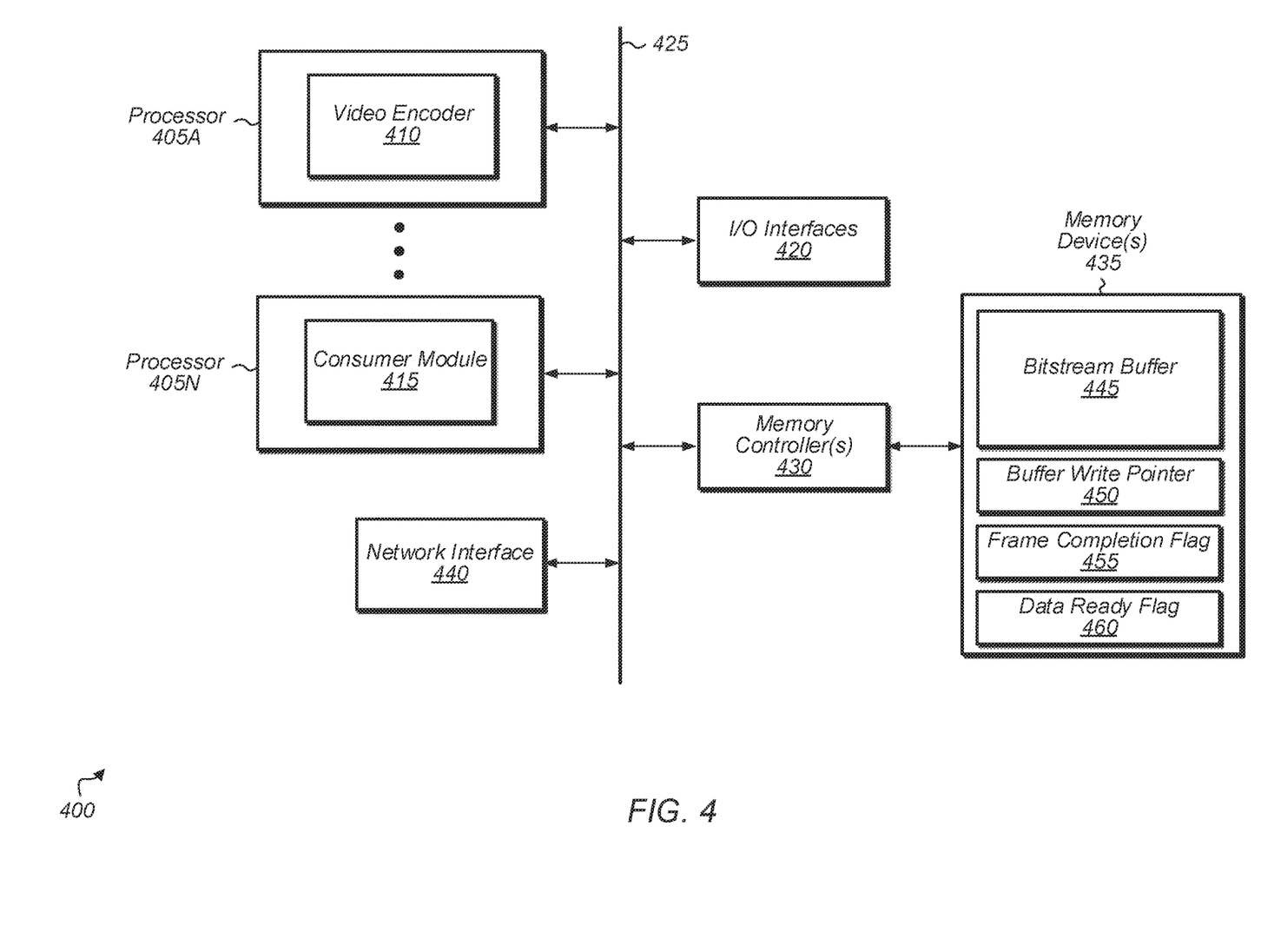
FIG. 4 is a block diagram of another implementation of a computing system.

Turning now to FIG. 4, a block diagram of another implementation of a computing system 400 is shown. In one implementation, computer system 400 includes processors 405A-N, I/O interfaces 420, bus 425, memory controller(s) 430, memory device(s) 435, and network interface 440. Processors 405A-N are representative of any type and number of processors (e.g., CPU, GPU, DSP, FPGA, ASIC). In one implementation, processor 405A includes circuitry to execute video encoder 410 for encoding a video bitstream. In one implementation, the circuitry of processor 405A executes software instructions to implement the functionality of video encoder 410. In another implementation, the circuitry of processor 405A includes control logic to implement the functionality of video encoder 410. In other implementations, any combination of hardware and/or software of processor 405A implements the functionality of video encoder 410.

In one implementation, processor 405N includes circuitry to execute consumer module 415 for accessing and processing an encoded video bitstream. In one implementation, the circuitry of processor 405N executes software instructions to implement the functionality of consumer module 415. In another implementation, the circuitry of processor 405N includes control logic to implement the functionality of consumer module 415. In other implementations, any combination of hardware and/or software of processor 405N implements the functionality of consumer module 415. In another implementation, a single processor 405 includes the hardware and/or software to implement both video encoder 410 and consumer module 415. In a further implementation, multiple processors 405A-N include the hardware and/or software to implement video encoder 410 and/or multiple processors 405A-N include the hardware and/or software to implement consumer module 415. It should be understood that in other implementations, system 400 includes other components and/or is organized in other suitable manners.

Video encoder 410 includes circuitry for encoding the frames of a video sequence into an encoded video bitstream. In one implementation, video encoder 410 stores an encoded bitstream in bitstream buffer 445 within memory device(s) 435. Bitstream buffer 445 is representative of any number and size of buffers and memory device(s) 435 are representative of any number and type of memory devices. Memory device(s) 435 are located in any suitable location within system 400. For example, in various embodiments, memory device(s) 435 are external to processor 405A, internal to processor 405A, implemented as one or more cache(s) of processor 405A, or otherwise. When video encoder 410 writes a portion of encoded data to bitstream buffer 445, video encoder 410 updates the value of buffer write pointer 450 to indicate how much data (e.g., how many bits) has been written to bitstream buffer 445. In some implementations, a data ready flag 460 is used to indicate that encoded data has been written to the buffer 445 and is ready for consumption. In other implementations, an update to the buffer write pointer 450 is detected and serves to indicate that encoded data has been written to the buffer 445 and is ready for consumption.

In one implementation, the frequency at which video encoder 410 updates buffer write pointer 450 is programmable. For example, in one implementation, consumer module 415 programs the frequency at which video encoder 410 updates buffer write pointer 450. In other words, consumer module 415 specifies an update granularity, with the update granularity defined as the number of bits which triggers an update to buffer write pointer 450. When video encoder 410 writes a number of bits to bitstream buffer 445 and the number of bits is greater than or equal to the update granularity, then video encoder 410 updates buffer write pointer 450. Otherwise, if the number of bits written to bitstream buffer 445 is less than the update granularity, then video encoder 410 does not update buffer write pointer 450. This helps avoid unnecessary memory transactions for updating buffer write pointer 450 if the consumer module 415 only consumes a particular size of bitstream chunk at a time. As used herein, a "chunk" refers to one or more bits. In some implementations a chunk refers to a particular number of bytes of data, while in other implementations a chunk refers to a number of bits that is not evenly divisible into bytes. All such implementations are possible and are contemplated. For example, in one implementation, consumer module 415 consumes chunk sizes that match the maximum size of a network transmission packet payload. In one implementation, the maximum size of a network transmission packet payload is 1024 bytes, and so consequently, consumer module 415 programs the update granularity to be equal to 1024 bytes (i.e., the chunk size is 8192 bits). In other implementations, the update granularity is set equal to other numbers of bits.

When an entire frame has been encoded, video encoder 410 ensures that the bitstream write pointer 450 contains the final bitcount of the entire frame bitstream, even if this final bitcount is less than the granularity programmed by consumer module 415. To handle the issue of the final bitcount, video encoder 410 sets the frame completion flag when the entire frame has been encoded. Setting the frame completion flag 455 notifies consumer module 415 that the frame encoding is complete and the bitstream write pointer 450 has the final frame bitcount. In various implementations, the consumer module 415 polls the frame completion flag 455 to determine if frame encoding is complete. In other implementations, a signal or other indication is generated to notify the consumer module 415 that data is ready for consumption. In this way, consumer module 415 is informed that bitstream write pointer 450 will no longer be updated for the frame so consumer module 415 is able to read any remaining bitstream bits even if the number of remaining bitstream bits is less than the specified granularity. The frame completion flag 455 is reset by consumer module 415 after consumer module 415 has retrieved all of the bits of bitstream buffer 445 for the current frame.

In one implementation, the storage location of bitstream write pointer 450 is determined by the consumer module 415 (e.g., a specific location in GPU memory). In one implementation, a separate bitstream write pointer 450 location is specified for each frame. This prevents consumer module 415 and video encoder 410 from having to synchronize their actions to maintain the state of a single bitstream write pointer 450 if the single bitstream write pointer 450 is used for multiple frames. In some implementations, updates to bitstream write pointer 450 are performed and communicated to the consumer module 415 by other entities besides the video encoder 410.

Figure 5:
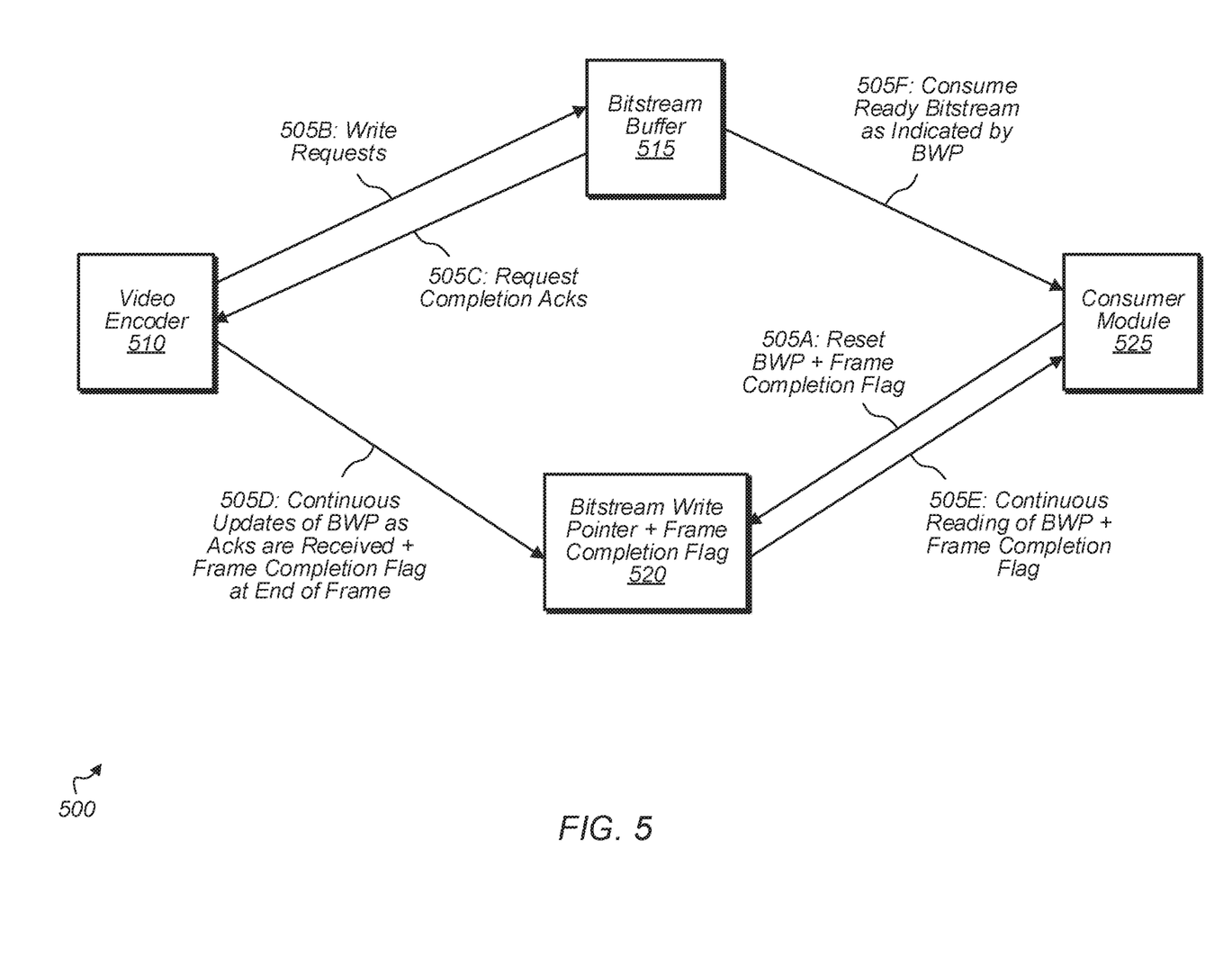
FIG. 5 is a block diagram of one implementation of a video encoder coupled to a consumer module.

Referring now to FIG. 5, a block diagram of one implementation of a computing system 500 having a video encoder coupled to a consumer module is shown. System 500 includes at least video encoder 510, bitstream buffer 515, bitstream write pointer (BWP) and frame completion flag 520, and consumer module 525. Bitstream buffer 515 is representative of any type of buffer or collection of storage elements for storing an encoded video bitstream. Also, bitstream buffer 515 is located within any of various memory devices or memory subsystems. For example, in one implementation, bitstream buffer 515 is stored in a GPU memory. In other implementations, bitstream buffer 515 is stored in other locations. An example routine implemented by video encoder 510 and consumer module 525 is shown in FIG. 5. It is noted that this routine is merely indicative of one implementation. In other implementations, other routines which differ from the example shown in FIG. 5 are possible and are contemplated.

In one implementation, the example routine begins in step 505A with the consumer module 525 resetting BWP and frame completion flag 520 at the end of a given frame and before the start of the next frame. As the video encoder 510 starts encoding the next frame, the video encoder 510 sends write requests with encoded data to bitstream buffer 515 in step 505B. The amount of data in each write request varies depending on the implementation. In response to the video encoder 510 sending write requests to bitstream buffer 515, the bitstream buffer 515 sends write request completion acknowledgments ("Acks") to the video encoder 510 when the data of the write request has been written to the bitstream buffer 515. In various implementations, data for a given frame is encoded as a whole in the sense that each portion of frame data that is encoded has a dependency on one or more other portions frame data. This is in contrast to prior art approaches in which slices of a frame are encoded independent of one another. As noted above, encoding slices independent of one another results in boundary artifacts due to the lack of prediction across slice boundaries. By encoding the entire frame data as a whole, even though portions of encoded frame data are readied for consumption during the encoding process, such boundary artifacts are eliminated.

In response to receiving a write request completion Ack in step 505C, video encoder 510 updates the value of the BWP in step 505D to indicate how much encoded data was written to the bitstream buffer 515. Alternatively, in some implementations, circuitry associated with the buffer 515 updates the BWP. Also, when the video encoder 510 has completed encoding an entire frame, the video encoder 510 updates the frame completion flag. In one implementation, the frame completion flag 455 is a single bit and video encoder 510 sets the frame completion flag to a value of one when the end of a frame has been reached. Consumer module 525 reads the BWP and frame completion flag 520 in step 505E to determine if encoded data is ready for consumption, if encoding of an entire frame is complete, and how far consumer module 525 is able to read from bitstream buffer 515 (how much data is ready for consumption). Then, based on the value of the BWP, consumer module 525 reads a portion of the encoded bitstream from bitstream buffer 515 in step 505F. In some implementations, a separate data ready flag is used to indicate that encoded data has been written to the buffer 515 and is ready for consumption. For example, by polling the data ready flag the consumer module 525 determines that data is ready for consumption. For example, the video encoder 510 sets the data ready flag on receipt of a write request Ack. Upon reading data from the buffer, the consumer module 525 resets the data ready flag. In such a case, the frame completion flag serves to indicate whether or not the data ready for consumption represents the final portion of a frame. It is noted that consumer module 525 is able to read from bitstream buffer 515 and retrieve encoded data for a given frame while video encoder 510 is still encoding the given frame. Also, consumer module 525 does not have to wait until an entire frame or slice has been encoded by the video encoder 510 before reading encoded data from the bitstream buffer 515. This helps to reduce the latency experienced by consumer module 525 when consuming encoded data from bitstream buffer 515 and also reduces the overall latency of the consumer application.

Figure 6:
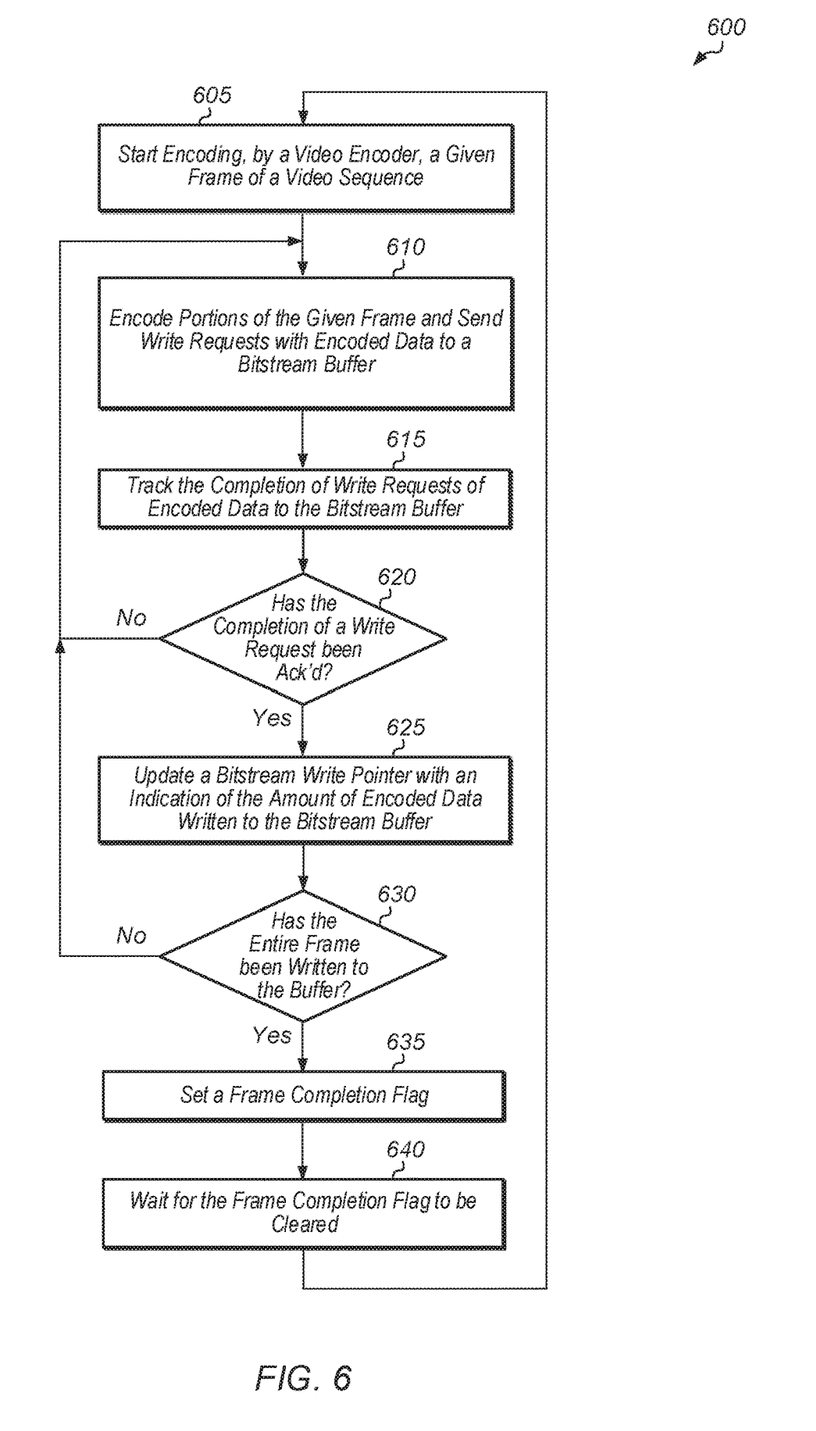
FIG. 6 is a generalized flow diagram illustrating one implementation of a method for enabling on-the-fly access to an encoded video bitstream of a given video frame while the given video frame is being encoded.
Figure 7:
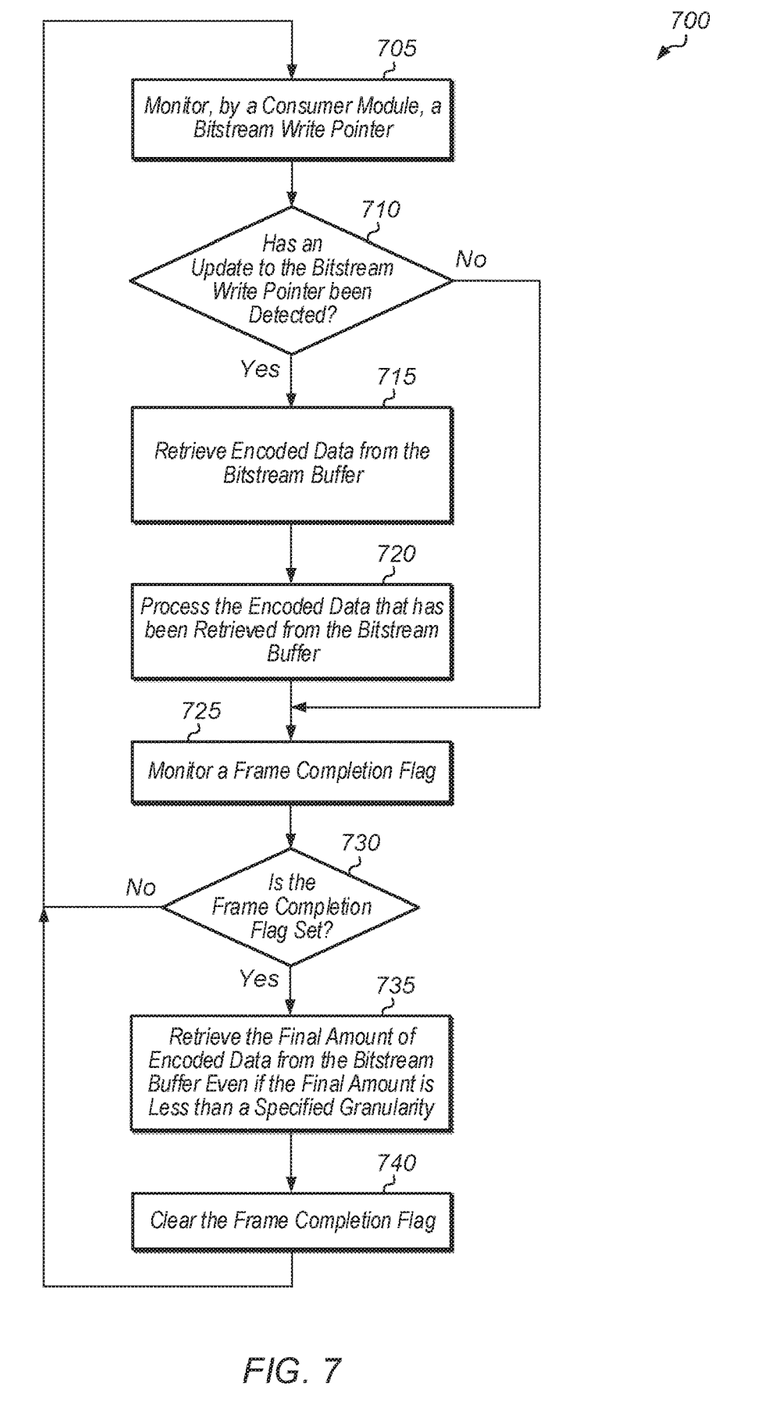
FIG. 7 is a generalized flow diagram illustrating one implementation of a method for a consumer module accessing an encoded video bitstream in real-time as the bitstream is being encoded.
Figure 8:
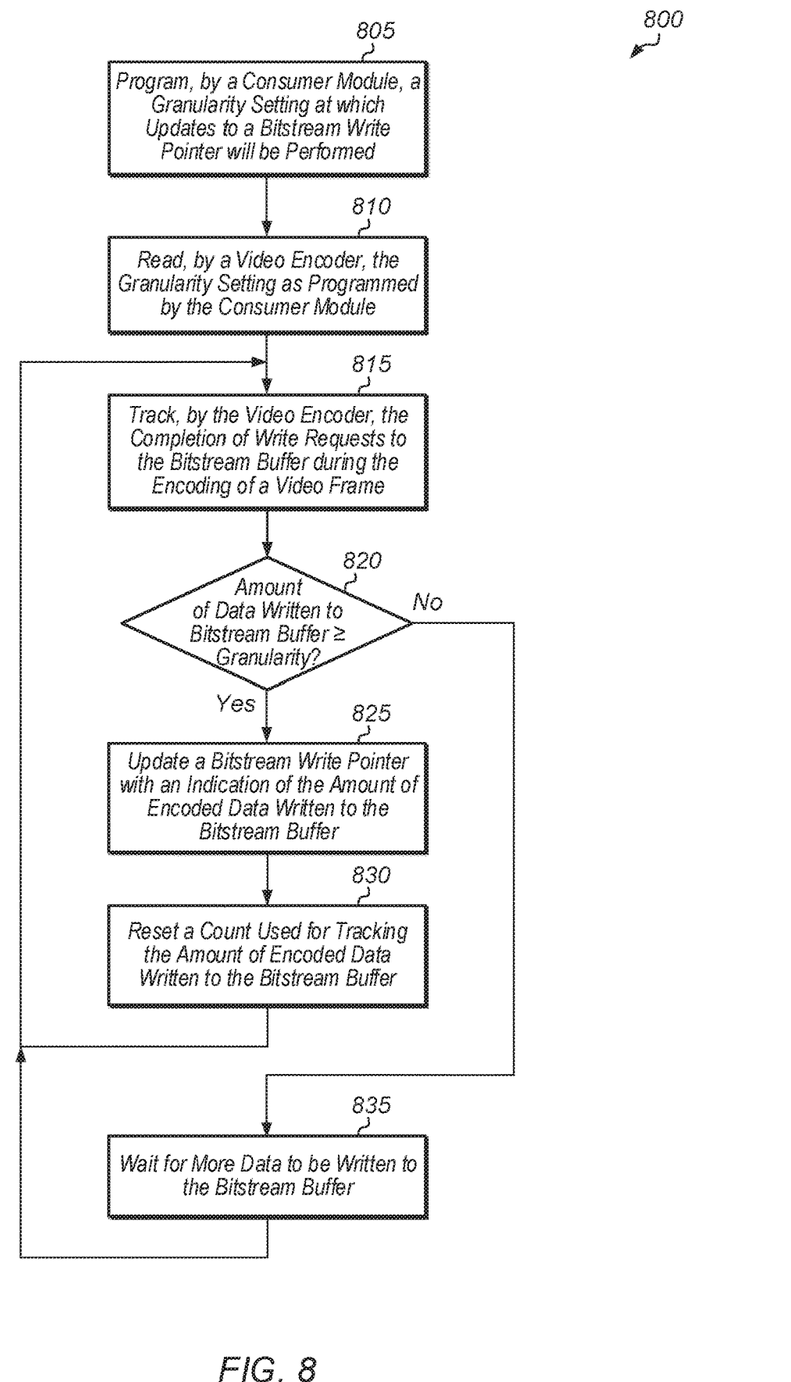
FIG. 8 is a generalized flow diagram illustrating one implementation of a method for controlling the granularity of bitstream write pointer updates.

Turning now to FIG. 6, one implementation of a method 600 for enabling on-the-fly access to an encoded video bitstream of a given video frame while the given video frame is being encoded is shown. For purposes of discussion, the steps in this implementation and those of FIGS. 7-8 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 600.

A video encoder starts encoding a given frame of a video sequence (block 605). As the video encoder encodes portions of the given frame, the video encoder sends write requests with encoded data to a bitstream buffer (block 610). Additionally, the video encoder tracks the completion of write requests of encoded data to the bitstream buffer (block 615). If the completion of a write request has been acknowledged (conditional block 620, "yes" leg), then the video encoder updates a bitstream write pointer with an indication of the amount of data written to the bitstream buffer (block 625). Depending on the implementation, the indication specifies an amount of data, a memory address which contains the last portion of data written to the bitstream buffer, or otherwise. It is noted that in one implementation, the update to the bitstream write pointer is performed as an atomic operation to prevent simultaneous access of the bitstream write pointer by both the video encoder and the consumer module. If no acknowledgments have been received for pending write requests (conditional block 620, "no" leg), then method 600 returns to block 610.

After block 625, the video encoder determines if the entire given frame has been encoded and written to the bitstream buffer (conditional block 630). If the entire frame has been encoded and written to the bitstream buffer (conditional block 630, "yes" leg), then the video encoder sets a frame completion flag (block 635). After block 635, the video encoder waits for the frame completion flag to be cleared (block 640), and then method 600 returns to block 605. In one implementation, the consumer module clears the frame completion flag. In another implementation, another entity, different from the consumer module, clears the frame completion flag. If the entire frame has not been encoded and written to the bitstream buffer (conditional block 630, "no" leg), then method 600 returns to block 610. It is noted that after the video encoder updates the bitstream write pointer following the completion of a write request, the video encoder does not insert a header (e.g., slice header) into the next portion of data that is encoded and written to the bitstream write buffer. Additionally, the video encoder is able to perform prediction (e.g., intra-frame coding prediction) across the boundary between the last portion of data that was encoded and written to the bitstream writer buffer and the next portion of data that is being encoded. For example, various encoding techniques encode pixel data using information (coded and/or uncoded) from other pixels in the frame (e.g., neighboring or other pixels). In this manner, the encoded data that crosses boundaries (slice, chunk, or otherwise) provides a more consistent result with a reduction in artifacts. Various such approaches are known to those skilled in the art and all such approaches are contemplated.

Referring now to FIG. 7, one implementation of a method 700 for a consumer module to access an encoded video bitstream in real-time as the bitstream is being encoded is shown. It is noted that in one implementation, method 700 is performed by the consumer module in parallel with a video encoder performing method 600. A consumer module monitors a bitstream write pointer (block 705). For example, in some implementations the consumer module polls the bitstream write pointer to determine if an update has been received. In other implementations, a flag (e.g., a data ready flag) is used to indicate data has been received and is ready for consumption. It is noted that in one implementation, the consumer module performs an atomic read in block 705 to prevent simultaneous access by the video encoder and the consumer module to the bitstream write pointer. If an update to the bitstream write pointer is detected (or the data ready flag is set) (conditional block 710, "yes" leg), then the consumer module retrieves encoded data from the bitstream buffer up to the location indicated by the bitstream write pointer (block 715). It is noted that the consumer module retrieves encoded data from the bitstream buffer for a given frame while the video encoder is still in the process of encoding the given frame. Then, the consumer module processes the encoded data that has been retrieved from the bitstream buffer (block 720). The consumer module performs any type of processing (e.g., streaming the encoded data over a network) depending on the implementation. If the bitstream write pointer has not been updated (conditional block 710, "no" leg), then method 700 jumps to block 725.

After block 720, the consumer module monitors a frame completion flag (block 725). If the frame completion flag is set (conditional block 730, "yes" leg), then the consumer module retrieves a final amount of encoded data from the bitstream buffer even if the final amount is less than a specified granularity (block 735). Next, the consumer module clears the frame completion flag (block 740). Alternatively, in another implementation, another hardware or software module clears the frame completion flag in block 740. After block 740, method 700 returns to block 705. If the frame completion flag is not set (conditional block 730, "no" leg), then method 700 returns to block 705.

Turning now to FIG. 8, one implementation of a method 800 for controlling the granularity of bitstream write pointer updates is shown. A consumer module programs a granularity setting at which updates to a bitstream writer pointer will be performed (block 805). For example, in one implementation, the consumer module programs the granularity setting to be equal to the maximum size of the network transmission packet payload. In other implementations, the consumer module programs the value of the granularity setting based on other factors. Next, a video encoder reads the granularity setting as programmed by the consumer module (block 810). Then, the video encoder tracks the completion of write requests to the bitstream buffer during the encoding of a video frame (block 815). Next, the video encoder determines, based on the completed write requests, if the amount of encoded data (e.g., number of bits) written to the bitstream buffer is greater than or equal to the granularity setting (conditional block 820).

If the amount of encoded data written to the bitstream buffer is greater than or equal to the granularity setting (conditional block 820, "yes" leg), then the video encoder updates a bitstream write pointer with an indication of the amount of encoded data written to the bitstream buffer (block 825). Also, the video encoder resets a count used for tracking the amount of encoded data written to the bitstream buffer (block 830). After block 830, method 800 returns to block 815. Otherwise, if the amount of encoded data written to the bitstream buffer is less than the granularity setting (conditional block 820, "no" leg), then the video encoder waits for more data to be written to the bitstream buffer (block 835). After block 835, method 800 returns to block 815.

Figure 9:
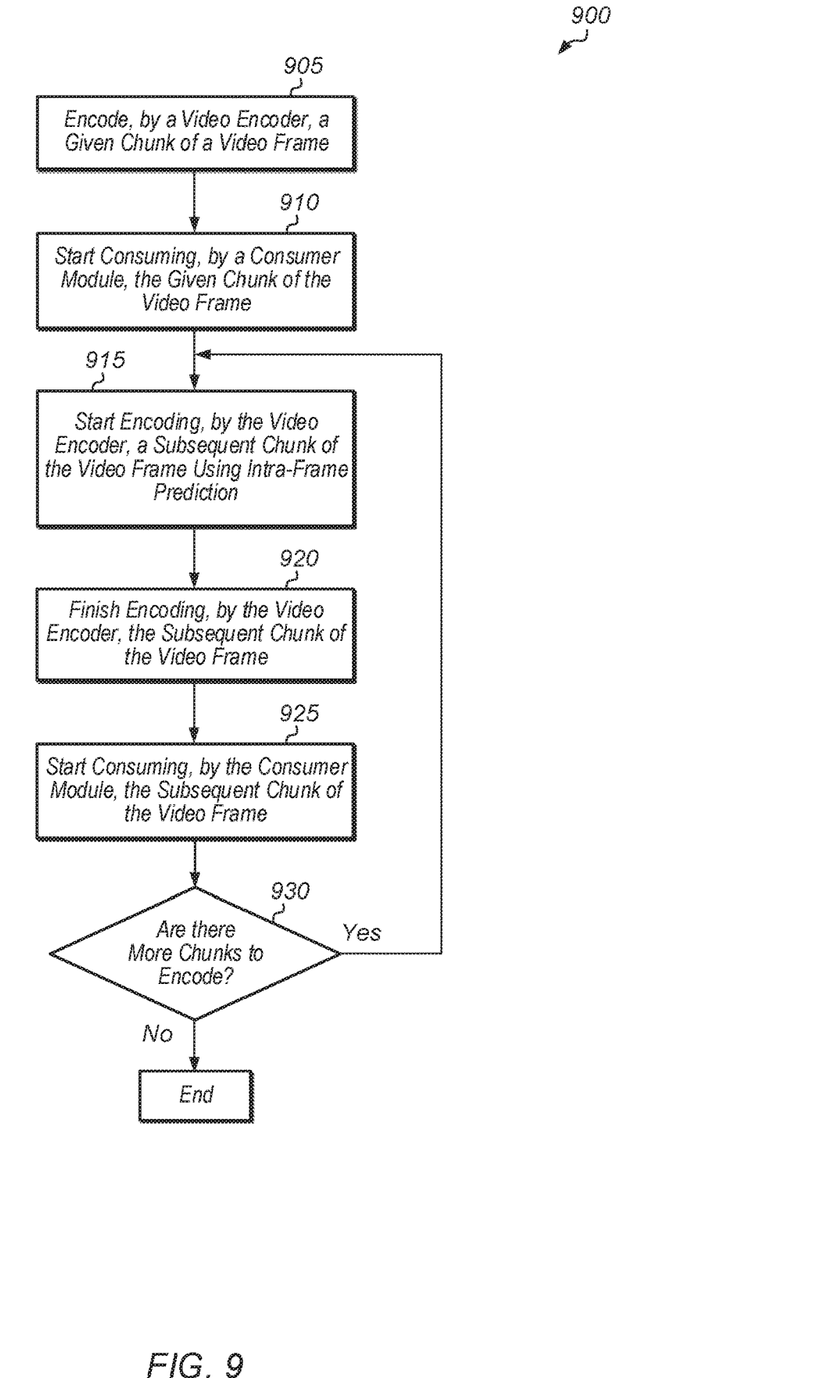
FIG. 9 is a generalized flow diagram illustrating one implementation of a method for a video encoder performing prediction across chunks being consumed.

Referring now to FIG. 9, one implementation of a method 900 for a video encoder performing prediction across chunks being consumed is shown. A video encoder encodes a given chunk of a video frame (block 905). Next, a consumer module starts consuming the given chunk of the video frame (block 910). In one implementation, the video encoder updates a buffer write pointer to let the consumer module know that there is an encoded chunk in a buffer which the consumer module is able to start consuming. Then, the video encoder starts encoding a subsequent chunk using intra-frame prediction (block 915). It is noted that blocks 910 and 915 are performed simultaneously in one implementation. Next, the video encoder finishes encoding the subsequent chunk (block 920). Then, the consumer modules starts consuming the subsequent chunk (block 925). It is noted that blocks 925 and 915 are performed simultaneously in one implementation. If there are more chunks to encode (conditional block 930, "yes" leg), then method 900 returns to block 915. If there are no more chunks to encode (conditional block 930, "no" leg, then method 900 ends.

Figure 10:
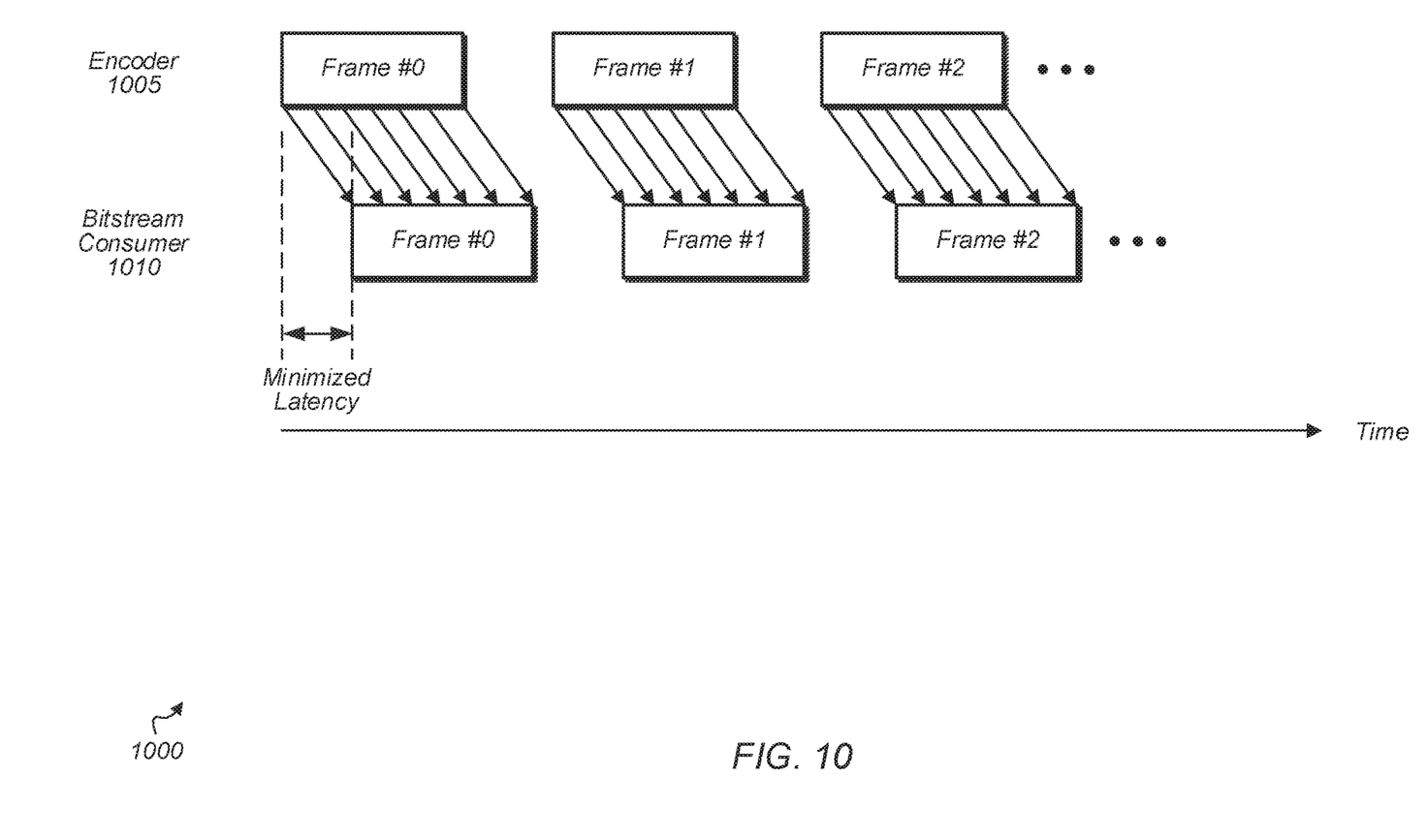
FIG. 10 illustrates a timing diagram of one implementation of real-time consumption of chunks of an encoded video bitstream.

Turning now to FIG. 10, a timing diagram 1000 of one implementation of real-time consumption of chunks of an encoded video bitstream is shown. In the implementation illustrated in timing diagram 1000, while encoder 1005 is encoding frames 0-2, bitstream consumer 1010 is able to consume a given chunk of the frame while encoder 1005 is encoding the next chunk of the frame. This helps to reduce the latency of operations as compared to the implementations illustrated in timing diagrams 200 (of FIG. 2) and 300 (of FIG. 3). For example, in one implementation, encoder 1005 encodes chunks of frame 0 and then updates a write pointer after each chunk to indicate how much encoded data was written to a buffer. Consumer 1010 is then able to access and consume each chunk of frame 0 from the buffer while encoder 1005 is encoding a subsequent chunk. This pattern continues for frames 1-2 and subsequent frames. The implementation illustrated in timing diagram 1000 helps to minimize latency by allowing the consumption of the encoded frames 0-2 to be pipelined with the encoding of frames 0-2. In this implementation, bitstream consumer 1010 is able to consume chunks of a frame at the same time that encoder 1005 is encoding subsequent chunks of the frame.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (MDL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
a consumer module; and
a video encoder comprising circuitry configured to:
encode one or more portions of a given video frame to generate one or more chunks of encoded data, the one or more portions comprising less than an entirety of the given video frame;
write the one or more chunks of encoded data to a buffer;
based at least in part on a determination that an amount of encoded data written to the buffer is equal to or greater than a received granularity specifying a size of encoded data:
provide an indication to notify the consumer module that the one or more chunks of encoded data are ready for consumption from the buffer by the consumer module; and
wherein the consumer module comprises circuitry configured to:
program the granularity at which the video encoder provides said indication; and
retrieve the one or more chunks of encoded data from the buffer prior to the video encoder completing encoding of the entirety of the given video frame, in response to detecting said indication.

2. The system as recited in claim 1, wherein the circuitry of the video encoder is further configured to provide said indication prior to encoding the entirety of the given video frame.

3. The system as recited in claim 1, wherein the circuitry of the video encoder is further configured to encode all portions of the given video frame using intra-frame coding prediction even though resulting chunks of encoded data are readied for consumption during the encoding process.

4. The system as recited in claim 1, wherein the circuitry of the video encoder is further configured to update a pointer in memory that is monitored by the consumer module, wherein a value of the pointer indicates how much data is included in the one or more chunks.

5. The system as recited in claim 1, wherein the granularity corresponds to a number of bits which triggers an update to said indication.

6. The system as recited in claim 4, wherein:
the circuitry of the video encoder is configured to set a frame completion flag when encoding of the given video frame is complete; and
the circuitry of the consumer module is configured to retrieve a final amount of encoded data from the buffer when the final amount is less than the granularity, responsive to detecting the frame completion flag is set.

7. The system as recited in claim 6, wherein the circuitry of the consumer module is configured to clear the frame completion flag responsive to retrieving the final amount of encoded data from the buffer.

8. A method comprising:
programming, by circuitry of a consumer module, a granularity at which a video encoder provides an indication that one or more chunks of encoded data is ready for consumption;
encoding, by the circuitry of the video encoder, one or more portions of a given video frame to generate the one or more chunks of encoded data, the one or more portions comprising less than an entirety of the given video frame;
writing, by the circuitry of the video encoder, the one or more chunks of encoded data to a buffer;
based at least in part on a determination that an amount of encoded data written to the buffer is equal to or greater than the granularity specifying a size of encoded data:
providing, by the circuitry of the video encoder, the indication to notify the consumer module that the one or more chunks of encoded data are ready for consumption from the buffer by the consumer module; and
retrieving, by circuitry of a consumer module, the one or more chunks of encoded data from the buffer prior to the video encoder completing encoding of the entirety of the given video frame, in response to detecting said indication.

9. The method as recited in claim 8, further comprising providing, by the circuitry of the video encoder, said indication prior to encoding the entirety of the given video frame.

10. The method as recited in claim 8, further comprising encoding all portions of the given video frame using intra-frame coding prediction even though resulting chunks of encoded data are readied for consumption during the encoding process.

11. The method as recited in claim 8, further comprising update a pointer in memory that is monitored by the consumer module, wherein a value of the pointer indicates how much data is included in the one or more chunks.

12. The method as recited in claim 8, wherein the granularity corresponds to a number of bits which triggers an update to said indication.

13. The method as recited in claim 11, further comprising:
setting, by the circuitry of the video encoder, a frame completion flag when encoding of the given video frame is complete; and
retrieving, by the circuitry of the consumer module, a final amount of encoded data from the buffer when the final amount is less than the granularity, responsive to detecting the frame completion flag is set.

14. The method as recited in claim 13, further comprising clearing, by the circuitry of the consumer module, the frame completion flag responsive to retrieving the final amount of encoded data from the buffer.

15. An apparatus comprising:
a memory;
a buffer; and
one or more processors coupled to the memory;
wherein the apparatus is configured to:
receive a granularity, programmed by a consumer module, at which a video encoder provides an indication that a first chunk of encoded data is ready for consumption;

read given video frame data from the memory;

encode one or more portions of the given video frame to generate one or more chunks of encoded data, the one or more portions comprising less than an entirety of the given video frame;

write the one or more chunks of encoded data to the buffer;

based at least in part on a determination that an amount of encoded data written to the buffer is equal to or greater than the granularity specifying a size of encoded data:

provide the indication to notify the consumer module that the one or more chunks of encoded data are ready for consumption from the buffer by the consumer module.

16. The apparatus as recited in claim 15, wherein the apparatus is further configured to provide said indication prior to encoding the entirety of the given video frame.

17. The apparatus as recited in claim 15, wherein the apparatus is further configured to encode all portions of the given video frame using intra-frame coding prediction even though resulting chunks of encoded data are readied for consumption during the encoding process.

18. The apparatus as recited in claim 17, wherein the apparatus is further configured to update a pointer in memory that is monitored by the consumer module, wherein a value of the pointer indicates how much data is included in the one or more chunks.

19. The apparatus as recited in claim 17, wherein the apparatus is further configured to:

set a frame completion flag when the encoding of the given video frame is complete; and retrieve a final amount of encoded data from the buffer when the final amount is less than the granularity, responsive to the frame completion flag being set.

20. The apparatus as recited in claim 19, wherein the apparatus is further configured to clear the frame completion flag responsive to retrieving the final amount of encoded data from the buffer.

* * * * *